Patented Jan. 24, 1950

2,495,235

UNITED STATES PATENT OFFICE 2,495,235

METHOD OF PREPARING VISCOSE

Paul Pierrat, Courbevoie, and Eugène Colombu, Paris, France, assignors to Societe de Constructions Mecaniques de Stains, Paris, France, a corporation of France No Drawing. Application June 2, 1947, Serial No. 751,951. In France December 27, 1943

Section 1, Public Law 690, August 8, 1946
Patent expires December 27, 1963

2 Claims. (Cl. 260—217)

This invention relates to the manufacture of viscose. More particularly, it relates to a new and improved process of producing viscose.

For the manufacture of viscose, cellulose pulp is steeped in an aqueous caustic solution containing 230 to 260 grams per liter for an appropriate period of time, after which the excess caustic soda solution, whose function is to remove the hemi-cellulose and mercerize the cellulose, i. e. convert it into alkali cellulose, is expressed, leaving a pressed mercerized cellulose generally having a caustic soda content of about 15% to 16% and a cellulose content of about 31% to 35%. This alkali cellulose is then shredded and the alkali cellulose crumbs ripened, i. e. left to rest for a specified time (e. g. 24 hours) at a substantially constant temperature (e. g. 21° C.) in order to depolymerize the cellulose molecule whereby a decrease of velocity for facilitating the subsequent transformation is obtained.

The ripened alkali cellulose is treated with carbon bisulfide at an appropriate temperature, and the resulting cellulose xanthate is dissolved in dilute caustic soda at a temperature equally well defined as a function of the properties of the viscose resulting from the operation. The viscose is thereafter subjected to several filterings and then ripened. These operations are also effected at a specified temperature and for a well defined period in order to provide the viscose with the necessary properties so that it can be converted into threads, films or other products.

At the beginning of the viscose industry, the first phases of the viscose preparation, i. e. mercerization, ripening, xanthation and dissolution, were carried out simultaneously in only one tank in which the cellulose, caustic soda and carbon bisulfide were simply mixed together.

Later, in order to have better control of the different phases, they were separated and carried out in different apparatus.

Thereafter, in order to speed up the operations, decrease the space occupied by the apparatus and increase the yield, a single apparatus, formed of a large tank with appropriate mixing devices and also with temperature control devices that could be regulated in accordance with the result desired, was again utilized. The mode of operation then consisted in mixing the cellulose pulp with aqueous caustic soda solution at a temperature to insure ripening (which is more rapid at an elevated temperature than at low temperatures), adding carbon bisulfide for the production of the cellulose xanthate, and thereafter adding dilute caustic soda to dissolve the xanthate. By this procedure, the hemi-celluloses were not eliminated and the ripening was irregular.

For this reason, the technique returned to the separation of the mercerizing and ripening phases. As a result, there was used an apparatus wherein carbon bisulfide was reacted with ripened shredded alkali cellulose and the resulting xanthate dissolved in dilute caustic soda. Such apparatus (known as a "Vakuum Xanthate" kneader and described on pages 349–350 of Kunstseide und Zellwolle nach dem Viskose-Verfahren by Kurt Gotze and in German Patent No. 443,298 and U. S. Patent No. 1,871,245) was provided with a bottom formed of two half cylinders in which two sets of kneading and mixing blades were mounted on a horizontal rotating shaft, one set serving for mixing and those of the other set serving to disintegrate, with a crushing action, the undissolved material.

The Vakuum Xanthate kneaders had to be provided with power motors to insure sufficient stirring during the reaction and an appropriate malaxation during the dissolution. The maintenance of uniform temperature in the heterogeneous and pulverulent mass, which was gummy or pasty on the inside, was difficult, and the consumption of heat or cooling, according to the phase, was not as economical as desired. The consumption of electric energy by such apparatus was often excessive and the yield poor. Additionally, the consumption of heat or cooling energy was much higher than that in the processes wherein the operating phases were not separated. Consequently, a great part of the advantage of the higher yield obtained by such apparatus was lost. On the other hand, the insufficient stirring during the reaction of the carbon bisulfide on the alkali cellulose resulted in an insufficient utilization of the bisulfide and 15% or more was lost during evacuation of the apparatus prior to the opening thereof, which is an indispensable operation from a hygienic viewpoint owing to the toxicity of carbon bisulfide. Additionally, the irregular reaction resulted in a turbid viscose which was difficult to filter.

Applicant has observed that the above-mentioned inconveniences and disadvantages can be eliminated to a great degree through the use of the combination of the following:

(1) Better distribution or division of the phases of operation;

(2) Adapting the mixing and stirring speeds to the different phases of operation;

(3) Adjustment of the speeds by means of a variable speed control.

It is known that alkali cellulose can be brought up to the desired temperature for the reaction by mixing it in the apparatus for a certain time at that temperature. It is also known that the quantity of water in the alkali cellulose is an important factor in the reaction. Additionally, it has been found that the dissolution of the xanthate can be improved by a preliminary treatment of the xanthate with concentrated caustic soda to form a pasty or viscous mass.

In accordance with this invention, the various known features have been combined to provide an improved method of preparing viscose in Vakuum Xanthate kneaders, and an object of the present invention is a process comprising the following steps in the order set forth:

(a) Preliminary cooling of the alkali cellulose to the desired temperature;

(b) Introducing carbon bisulfide and then a predetermined quantity of water;

(c) Permitting the reaction between the carbon bisulfide and alkali cellulose to proceed;

(d) Forming a pasty mass with a concentrated solution of a caustic soda;

(e) Diluting the mass with a dilute solution of caustic soda or with water.

By this process, the power consumption can be reduced from 40% to 50% of that of the prior procedures and the loss in carbon bisulfide reduced to one-half that of the prior procedures.

Another object of the invention is to adapt the mixing speed with each phase of operation, for example, by speed controls such as used on automobiles or a bi- or poly-polar motor or by a combination of such means, such as, for example, by associating a three-gear device with a bi-polar motor whereby six different speed combinations are possible. Preferably, the changes in mixing speed are obtained by a continuous speed regulator, such as, for example, one of the well-known P. I. V. types, or a hydraulic control, such as the Hele-Shaw, which comprises a set of pistons arranged radially in a rotating case with adjustable eccentricity. Thus, a large change of speed variations can be obtained.

In general, while the alkali cellulose is brought to the desired temperature and also while the xanthate is being formed into a pasty mass with the concentrated caustic, a medium mixing speed is utilized. During the reaction period, the mixing speed is reduced and finally, during dissolution, the mixing speed is increased.

In order to more clearly explain the invention, two comparative examples are hereafter given and the results obtained:

(A) Process utilizing constant speed of the mixing elements;

(B) Process of the present invention in which the speeds of the mixing elements are adapted to each phase of the process.

As previously mentioned, the Vakuum Xanthate kneaders as well as the older dissolving mixers are provided with two types of blades, the blades of one type serving for the mixing proper and those of the other type serving to disintegrate, with a crushing action, the non-dissolved substances.

*Example A.—Prior art procedure*

In a Vakuum Xanthate kneader operated in the known manner and wherein the blades of the first type were rotated at 23 R. P. M. and those of the second type rotated at 15.5 R. P. M., ripened alkali cellulose was subjected to a temperature of 22° to 24° C. for a period of 30 minutes. Thereafter, the carbon bisulfide was introduced in 15 minutes and the reaction permitted to proceed for 2½ hours at 24° to 28° C. Thereafter, the xanthate was formed into a pasty mass at 20° C. in 1 hour by the addition of caustic soda of 300 grams per liter concentration, after which the required quantity of caustic soda solution of 25 grams per liter concentration was added to produce the desired viscose. The diluting operation was completed in 2 hours.

In this Example A, the consumption of electric power was 80 kw. per charge of 240 kilograms of cellulose pulp. The carbon bisulfide was added in an amount comprising 36% to 37% based on the alpha-cellulose content of the pulp, and 12% to 13% of the carbon bisulfide was unreacted and lost. The formation of the xanthate into a pasty mass and the dissolving thereof were difficult, and the resulting viscose was fibrous and filtered at a rate of 20 kilograms per square meter of filter.

*Example B*

In a Vakuum Xanthate kneader, such as used in Example A, and wherein the blades were rotated as hereinafter set forth, ripened alkali cellulose was subjected to a temperature of 22° to 24° C. for a period of 1 hour in order to insure a homogeneous temperature throughout the mass. Thereafter, the carbon bisulfide was introduced in 15 minutes. To the same quantity of alkali cellulose as used in Example A, 100 liters of water were added in 5 minutes, and the reaction was permitted to proceed for 1 hour. The formation of the xanthate into a pasty mass under the same conditions as set forth in Example A was completed in 1 hour and the dilution in 55 minutes. The total duration of the operations was thus reduced from 6 hours and 15 minutes (Example A) to 4 hours and 15 minutes (Example B).

During the operations, the rotating speeds of the mixing blades and the crushing blades were respectively as follows:

18 R. P. M. and 12 R. P. M. during the temperature adjustment;

9 R. P. M. and 6 R. P. M. during the reaction;

20 R. P. M. and 13.3 R. P. M. during the formation of the pasty mass;

30 R. P. M. and 20 R. P. M. during the dilution.

The consumption of power in this example was 20 kw. per charge (240 kilograms of cellulose pulp), which was one-quarter of that consumed in Example A. The quantity of carbon bisulfide added can be reduced to from 30% to 32% without any inconvenience. The viscose blended easier and was more limpid than that obtained by the process of Example A. The viscose could be filtered at a rate of 40 kilograms of viscose per square meter of viscose. The loss of unreacted carbon bisulfide was 3% to 4%, i. e. one quarter to one-third of that of Example A.

The salt point of the viscose was increased despite the decrease of the quantity of carbon bisulfide.

The control of the heating and cooling was considerably improved.

The above relationship of the speeds of the mixing elements in each of the steps can be utilized in apparatus of various sizes.

Since it is obvious that various changes and

We claim:

1. A process for the preparation of viscose in a kneading and crushing device, which comprises adding carbon disulfide and water to a mass of alkali cellulose in said kneading device while crushing and kneading with a rotary motion, continuing said crushing and kneading after completion of the addition of carbon disulfide with a rotary motion at a speed of about half of the corresponding initial rates to complete the conversion of the alkali cellulose to cellulose xanthate, adding sufficient concentrated caustic soda to convert the xanthate into a pasty mass while crushing and kneading with a rotary motion at a speed of about the corresponding initial rates, and then diluting the mass to form viscose while crushing and kneading with a rotary motion at a speed about 50% higher than their corresponding initial rates.

2. A process as set forth in claim 1, wherein the approximate speeds of the crushing and kneading motion respectively during the steps of the process are as follows:

(a) 18 R. P. M. and 12 R. P. M. during the step wherein the carbon disulfide and water are added;
(b) 9 R. P. M. and 6 R. P. M. during the reaction period;
(c) 20 R. P. M. and 13.3 R. P. M. during the conversion of the xanthate into a pasty mass by the addition of concentrated caustic soda; and
(d) 30 R. P. M. and 20 R. P. M. during the dilution.

PAUL PIERRAT.
EUGÈNE COLOMBU.

REFERENCES CITED

The following references are of record in the file of this patent:

UNITED STATES PATENTS

| Number | Name | Date |
| --- | --- | --- |
| 1,871,245 | Thurm | Aug. 9, 1932 |
| 2,222,050 | Stoeckly et al. | Nov. 19, 1940 |

OTHER REFERENCES

Vollrath, Rayon Textile Monthly, July 1936, pages 46 to 48.